INVENTOR
CECIL G. VOKES

Patented May 27, 1952

2,598,322

UNITED STATES PATENT OFFICE 2,598,322

POROUS FILTER

Cecil Gordon Vokes, Guildford, England, assignor to Vokes, Limited, Guildford, England, a British company Application October 25, 1946, Serial No. 705,555
In Great Britain December 3, 1945

5 Claims. (Cl. 210—119)

This invention relates to filtering units of porous material of the kind described and claimed in Patent No. 2,448,930 to Edward Arthur Stokes for Porous Filter.

According to the present invention, a filtering unit comprises a tubular element of porous material having spaces in the tube wall filled with the same material in skeleton form and integral with the material of the wall.

From another aspect, the invention provides filtering apparatus including a filtering element constituting a tube of porous ceramic material, the tube wall having a hollow in communication with the clean side of the element and formed in the hollow a skeleton filling or reinforcement of the same material as and integral with the wall of the tube.

The tubular filtering element may be formed by a method which includes inserting a suitable foraminated spacing layer between two layers of ceramic material in plastic state, moulding the element with the spacing layer in position so as to produce a filling of the interstices in the spacing layer of the plastic ceramic material integral with that of the two layers and removing the spacing layer by heat.

Figure 1:
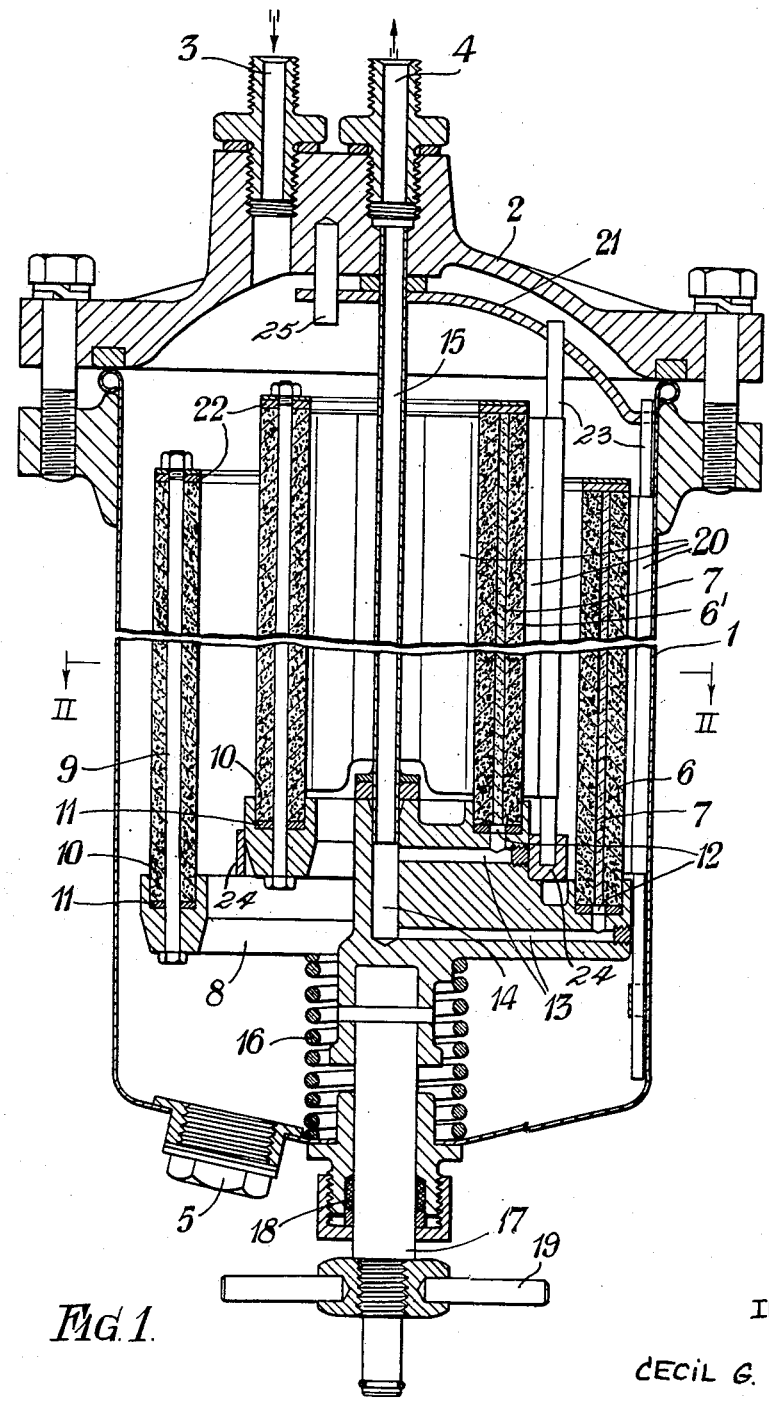
Figure 2:
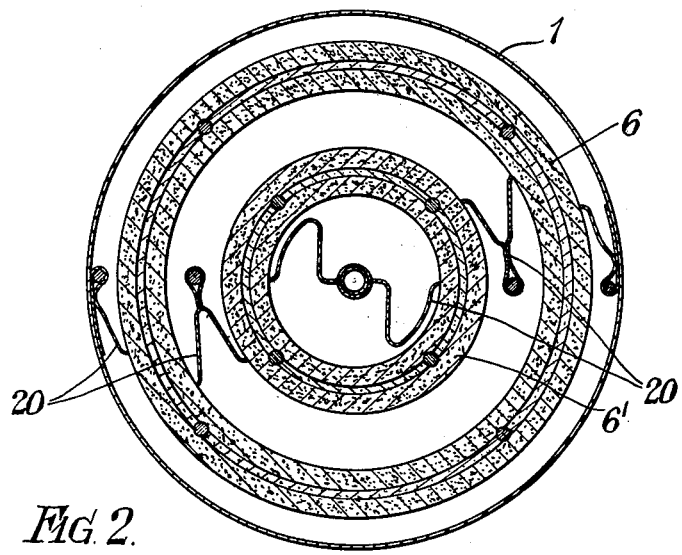
Figure 4:
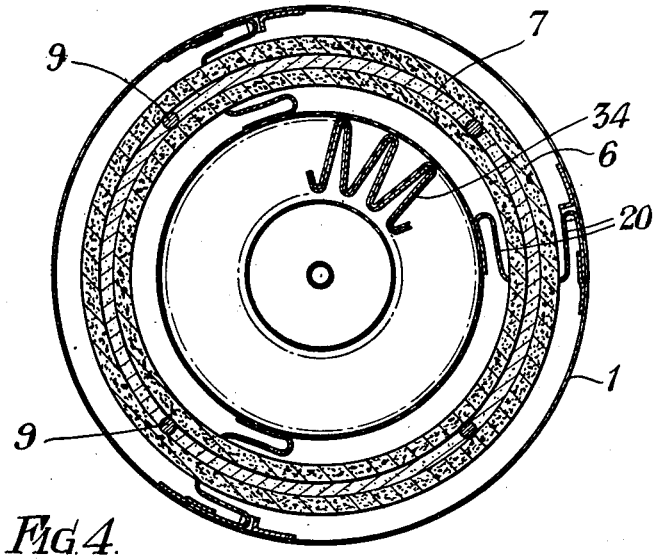
Figure 3:
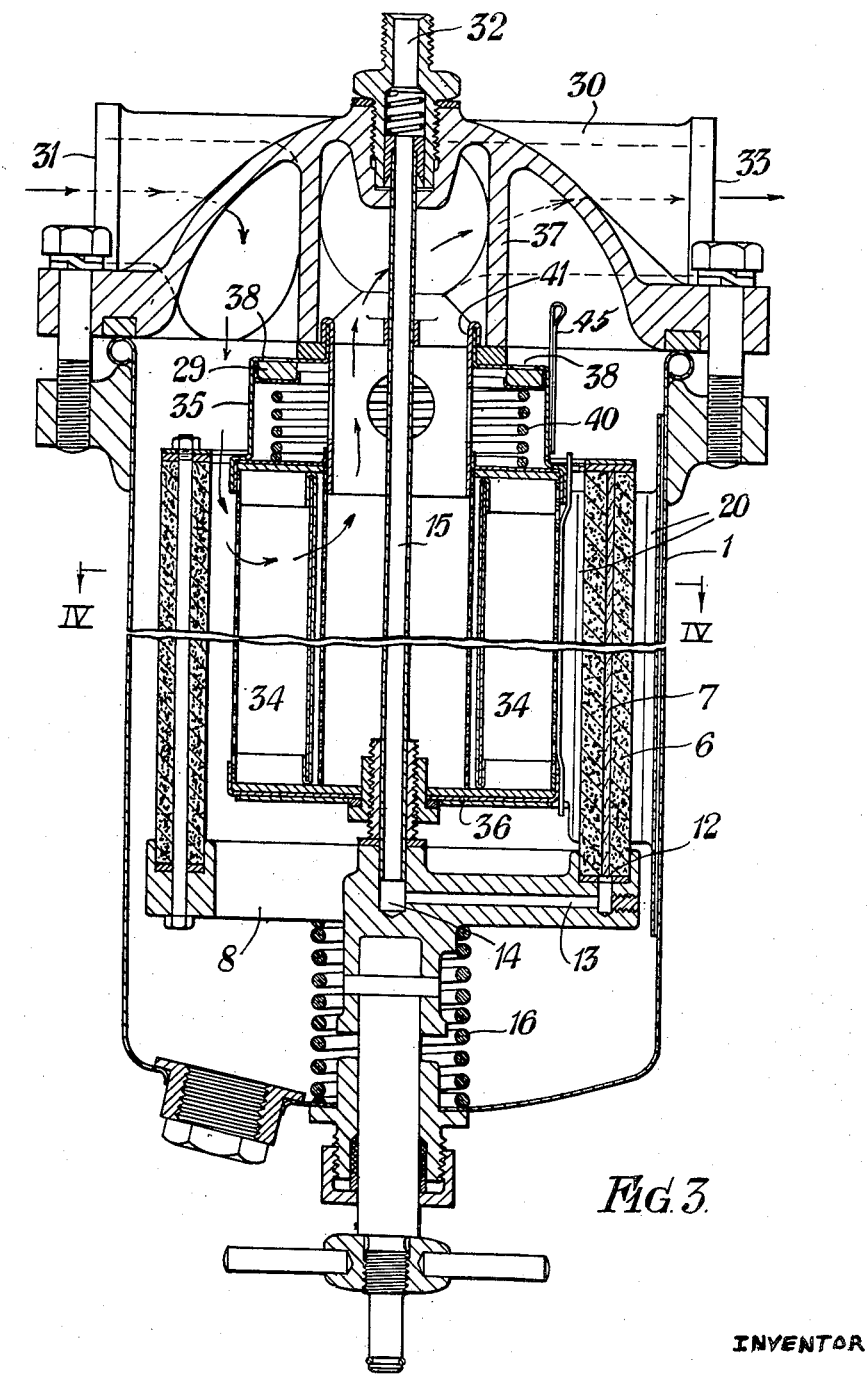

Other parts of the invention are embodied in the typical forms of filter which will now be described with reference to the accompanying drawings in which:

Fig. 1 is a cross section of one form of filter,
Fig. 2 is a section on the line II—II of Fig. 1,
Fig. 3 is a cross section of another form of filter, and
Fig. 4 is a section on the line IV—IV of Fig. 3.

In the form shown in Figs. 1 and 2, the filter comprises a casing 1 having a cover 2 in which cover are provided an inlet 3 for fluid to be filtered and an outlet 4 for filtered fluid. A drain plug 5 is provided in the bottom of the casing.

Mounted within the casing are the filtering elements which comprise two tubular elements 6, 6' of porous ceramic material arranged one inside the other with a space between them. Each element is formed with a hollow space 7 in the tube wall which is filled with the same material in skeleton form and integral with the material of both the adjacent walls of this space 7.

The tubes as shown are cylindrical and are arranged co-axially but obviously the tubes may be of other section or may be arranged non-coaxially if desired.

The tubular elements are formed by moulding from ceramic material with a suitable foraminous spacing layer between two layers of the ceramic material and then removing the spacing layer by heat. The spacing layer may be of material carbonising at a temperature not greater than that employed for kilning the ceramic material or of material having a melting point below the temperature which can be withstood without damage by the ceramic material.

The elements 6, 6' are supported by a spider 8 to which they are fixed by screwed rods 9 passing longitudinally through the wall of the element. The bottom edges of the elements engage annular recesses 10 in the spider, resting on joining rings 11. The upper ends of the spaces 7 are closed by annular rings 22 of suitable impervious material retained in position by the rods 9.

The spaces 7 in the walls of the elements are thus closed except for ports 12 in the bottoms of the recesses 10 which communicate with passages 13 in the spider leading to an axial passage 14. This passage 14 is connected by a tube 15 to the outlet 4 in the cover 2.

The spider is supported from the bottom of the casing 1 by a spring 16 and is fixed to a spindle 17 passing through a gland 18 to the outside of the casing. A handle 19 is provided on the spindle 17 so that the tubular elements may be rotated from outside the casing relative to scraper blades 20 for cleaning purposes. The scraper blades 20 are respectively carried by the tube 15 and by rods 23 which depend from a frame 21. The inner of said rods are fixed at their lower ends to a ring 24 that is abutted by the spider 8 and limits upward movement thereof by the spring 16, so that the filtering elements 6, 6' coincide with the scrapers 20. The frame 21 surrounds the tube 15 to locate the blades 20 relative to the walls of the tubular filters 6, 6' and said frame is non-rotatively connected by a stud 25 with the cover 2 to prevent rotation of the blades 20.

Fluid to be filtered enters the casing 1 through the inlet 3, passes through the walls of the ceramic elements into the spaces 7 and from thence through the ports 12, passages 13 and tube 15 to the outlet 4. Impurities in the fluid will be deposited on the outsides of the tubular elements from which they can be removed by rotating the elements against the scraper blades. The elements are resiliently mounted to prevent damage to them by shock.

In the form shown in Figs. 3 and 4, a tubular filtering element, having spaces in the tube wall filled with the same material in skeleton form and integral with the material of the wall, is associated with a less fine filter element arranged in the same casing, the fluid passing from a common inlet through the two elements to separate outlets. The mass of the fluid passes through the less fine element whilst a proportion of the fluid passes through the finer tubular element and is finely filtered, so that the proportion of fine impurities in the whole of the fluid is reduced without the excessive back pressure that would result if the whole of the fluid was finely filtered.

The tubular filtering element 6 is mounted in a casing 1 generally as described with reference to Figs. 1 and 2. The casing 1 is closed by a header 30 having an inlet 31, an outlet 32 for fluid passing through the tubular element 6 and an outlet 33 for fluid passing through the less fine element 34.

This less fine element 34 is of deeply pleated material arranged between top and bottom closure members 35 and 36 and is mounted coaxially within the tubular element 6 on the spider 8. The top closure member 35 is pressed against the end of a sleeve 37 in the header 30, the interior of this sleeve being in communication with the outlet 33. The closure member 35 may have a cylindrical flange 41 which protrudes into the interior of the sleeve 37.

In the top closure member 35 are ports 38 which are normally closed by an annular valve member 29 pressed against the inside of the top closure member 35 by a spring 40. The outer scraper blades 20 may be mounted directly on the casing while the inner scraper blades 20 are carried by the less fine filter element 34, said blades being mounted at their ends to the top and bottom closure members 35 and 36. A stud 45 extends upwardly from the top closure member 35 into a recess in the header 30 to prevent rotation of the inner blades 20.

Normally fluid passes from the inlet 31 into the casing 1, part of this fluid passing through the tubular element 6 to the outlet 32 and the remainder (usually the greater part) passing from the outside to the inside of the star-shaped element 34 and to the outlet 33. Should, however, the element 34 become clogged and a back pressure greater than a predetermined value be set up, the annular valve member 29 is forced down against the pressure of the spring 40 and fluid passes from the inlet 31 through the ports 38 to the outlet 33 by-passing the element 34. The passage of fluid through the tubular element 6 is not affected by the by-passing of the element 34.

It will be understood that the invention is not restricted to the details of the forms described by way of example which may be modified without departing from the broad idea underlying the invention.

I claim:

1. Filtering apparatus comprising a casing having a header including an inlet and two outlets, a tubular element of porous molded material having spaces in the tube wall fitted with the same material in skeleton form and integral with the material of the wall, said tubular element being mounted within the casing, a spider supporting said tubular element and including passage means for connecting the spaces in the tube wall with one of the outlets from the casing, a filter element less fine than the tubular element mounted on said spider interiorly of said tubular element, a spring supporting said spider and biasing said latter filter element against said header, and means for connecting the interior of said less fine filter element with the other of said outlets.

2. Filtering apparatus according to claim 1 having means operated by the attainment of a predetermined back pressure in the casing for connecting the inlet to the casing with the outlet to which the less fine filter element is connected.

3. A filter comprising a casing having an inlet and an outlet, a tubular filter element of molded porous material having a coarsely porous intermediate stratum between finely porous outer strata all of the same material and integrally united, a spider in said casing supporting the bottom of said filter element and having a drain channel open to said intermediate stratum of said filter element, means securing said tubular filter element on said spider and closing the top of said intermediate stratum to prevent direct ingress and egress, passage means from said spider channel to said casing outlet, a spindle fixed with said spider and depending through said casing for rotation of said spider, a spring in said casing resiliently supporting said spider and biasing it upwardly, support means interposed between said spider and the top of said casing and limiting the spring imposed movement of said spider, means connecting said support means with said casing to prevent relative rotation therebetween, and at least one scraper blade carried by said support means in engagement with at least one of the cylindrical walls of said tubular filter element to scrape said walls when the spider is rotated by said spindle.

4. A filter as defined in claim 3 wherein said passage means comprises a tube centrally disposed in said casing and engageable between said casing and the center of said spider to form with said spindle a pivotal mounting for said spider, said support means surrounding said tube to locate said scraper blade relative to said tubular filter wall.

5. A filter as defined in claim 3 wherein said support means comprises a second filter element that is less fine than said tubular filter element, said casing having a second outlet in communication with said second filter element.

CECIL GORDON VOKES.

REFERENCES CITED

The following references are of record in the file of this patent:

UNITED STATES PATENTS

| Number | Name | Date |
|---|---|---|
| 597,248 | Rhood | Jan. 11, 1898 |
| 730,485 | Simoneton | June 9, 1903 |
| 781,107 | Stewart | Jan. 31, 1905 |
| 789,617 | Linke | May 9, 1905 |
| 803,238 | Lynn | Oct. 31, 1905 |
| 1,179,157 | Braun | Apr. 11, 1916 |
| 1,652,173 | Lalor | Dec. 13, 1927 |
| 2,276,118 | Taylor | Mar. 10, 1942 |
| 2,301,120 | Kamrath | Nov. 3, 1942 |
| 2,378,737 | Simkovits | June 19, 1945 |
| 2,406,308 | Vokes et al. | Aug. 20, 1946 |
| 2,448,930 | Stokes | Sept. 7, 1948 |

FOREIGN PATENTS

| Number | Country | Date |
|---|---|---|
| 11,700 | Great Britain | of 1897 |
| 746,944 | France | Mar. 21, 1933 |